US009256997B2

(12) United States Patent
Rutledge et al.

(10) Patent No.: US 9,256,997 B2
(45) Date of Patent: Feb. 9, 2016

(54) SECURE REPAIR KIOSK SYSTEM AND METHOD

(71) Applicant: FOXPAW, O'Fallon, MO (US)

(72) Inventors: Richard S. Rutledge, O'Fallon, MO (US); Dave Glover, O'Fallon, MO (US)

(73) Assignee: FOXPAW, O'Fallon, MO (US)

( * ) Notice: Subject to any disclaimer, the term of this patent is extended or adjusted under 35 U.S.C. 154(b) by 0 days.

(21) Appl. No.: 14/504,108

(22) Filed: Oct. 1, 2014

(65) Prior Publication Data

US 2015/0145642 A1 May 28, 2015

Related U.S. Application Data

(60) Provisional application No. 61/908,434, filed on Nov. 25, 2013.

(51) Int. Cl.
*G07C 9/00* (2006.01)
(52) U.S. Cl.
CPC .................... *G07C 9/00134* (2013.01)
(58) Field of Classification Search
CPC ............................ G07C 9/00; G07C 9/00134
USPC ............... 340/5.51, 5.52, 5.53, 5.54, 5.2, 5.3, 340/568.1
See application file for complete search history.

(56) References Cited

U.S. PATENT DOCUMENTS

| 6,882,269 | B2 | 4/2005 | Moreno | |
|---|---|---|---|---|
| 2006/0254862 | A1* | 11/2006 | Hoersten | G06Q 10/06311 186/52 |
| 2006/0259262 | A1* | 11/2006 | Kuehnrich | G07F 9/02 702/104 |
| 2007/0241927 | A1* | 10/2007 | Ratnakar | G06F 17/30 340/4.6 |
| 2010/0057871 | A1* | 3/2010 | Kaplan | G07F 9/026 709/206 |
| 2012/0143708 | A1 | 6/2012 | Viviano et al. | |

* cited by examiner

*Primary Examiner* — Allen T Cao
(74) *Attorney, Agent, or Firm* — Polsinelli PC

(57) ABSTRACT

A secure repair kiosk system is provided for receiving items/devices for repair. The secure repair kiosk system includes a kiosk that receives items for repair. The kiosk includes multiple holding slots that each contains a transfer box used as a secure and traceable means for transferring devices to and from a remote repair site. A customer interacts with a user interface of the Kiosk to generate repair drop-off request and gain access to an empty transfer box. An empty particular transfer box is presented to a user during drop-off of the device that will typically accompany the device during transfer to the repair site, during repair of the device, during transfer back to the Kiosk, and delivery to the user. The customer interacts with the user interface of the Kiosk to generate repair pick-off request and gain access to a transfer box that contains that customers repaired device.

17 Claims, 17 Drawing Sheets

FIG. 6I

SECURE REPAIR KIOSK SYSTEM AND METHOD

CROSS REFERENCE TO RELATED APPLICATION

The patent application claims priority to U.S. Provisional Patent Application Ser. No. 61/908,434 entitled SECURE REPAIR KIOSK SYSTEM AND METHOD, filed on Nov. 25, 2013, the disclosure of which is hereby incorporated by reference herein.

TECHNICAL FIELD

Aspects of the present disclosure generally relate to kiosks. More specifically, the present disclosure relates to a kiosk system that is configured to allow for small computing devices such as smart phones, tablet computers, and laptop computers to be left at a secure kiosk for repair and where the location of the device is logged at each step in the repair process.

BACKGROUND

Kiosks are becoming increasingly popular among some businesses as a means for selling their products or services. For example, convention kiosks have been used to sell DVDs, food, lottery tickets, and photo processing services. One particular advantage of kiosks is they enable businesses to offer a desired product or service to consumers while avoiding higher overhead costs typically associated with standard brick and mortar establishments.

Another advantage of kiosks is the potential 24/7 product/service accessibility that they provide consumers. Due to busy work and/or social schedules, consumers may not have the time or opportunity to visit retail establishments during operating hours. By offering products and services via Kiosk, business can sell products or services when most brick and mortar establishments are closed.

Some services offered by businesses have not been successfully implemented or sold with a kiosk. For example, conventional repair services performed at brick and mortar establishments may require a customer to wait for an item to be repaired or require the customer to drop-off the item and return later to pick-up the item. In the case of a conventional kiosk, depending of the type of item, consumers may be hesitant to drop-off certain types of items for repair. For example, consumers may be more hesitant to drop-off personal electronic devices, such as mobile phones and tablet computers, at a kiosk due to concerns of traceability and security.

Therefore, a kiosk system is needed which enables a customer to drop-off mobile computing devices, such as smart phones, tablets, or other valued items, for repair and to accept such repaired devices/items for pick-up by the customer. Additionally, such a system needs to address consumer concerns by providing traceability, security, and convenience when dropping off such items for repair.

SUMMARY

A secure repair kiosk system and methods is provided that accepts mobile computing devices for repair. The secure repair kiosk system includes a kiosk that contains multiple transfer boxes, a user interface, one or more processing components, and a pick-up bay. Each transfer box is configured to receive at least one device for secure and traceable transport to and from a remote repair site. Each transfer box includes a unique encrypted identification code and is equipped with an electromagnetic locking mechanism.

The user interface is responsive to user input to generate a drop-off request. The one or more processing components are responsive to the drop-off request to retrieve an empty transfer box and deliver to the user via the pick-up bay. The pick-up bay is outfitted with an electronic reader that unlocks the transfer box so that the user can deposit a device therein. After a device is repaired and returned to the kiosk, the kiosk is responsive to a pick-up request received via the user interface to retrieve the transfer box that contains the repaired device and deliver to the user via the pick-up bay.

BRIEF DESCRIPTION OF THE DRAWINGS

FIGS. 6A-I depict graphical user interfaces used in the operation of the kiosk.

DETAILED DESCRIPTION

According to one aspect, a secure repair kiosk system is provided. Each kiosk includes a plurality of holding slots, each for storing a transfer box. A customer logs into the kiosk and drops off an electronic device for repair. The user places the device into a transfer box located in a pickup bay and an electronic reader locks the box before a robotic system moves the transfer box to a holding slot. An alert is generated whenever an electronic device is dropped off at the kiosk to notify a repairman to pick up the device. A repairman logs in and opens the kiosk to retrieve each transfer box containing an electronic device. The transfer boxes are transported to a remote location for repairing the device. A repairman opens the transfer box using an electronic reader, performs the repair, and replaces the device back inside the transfer box. The transfer box is again locked using the electronic reader and transported back to the kiosk and placed back into an open holding slot. The user later returns and retrieves their repaired device by logging back into the kiosk, which in turn retrieves the appropriate transfer box and unlocks it.

Figure 1:
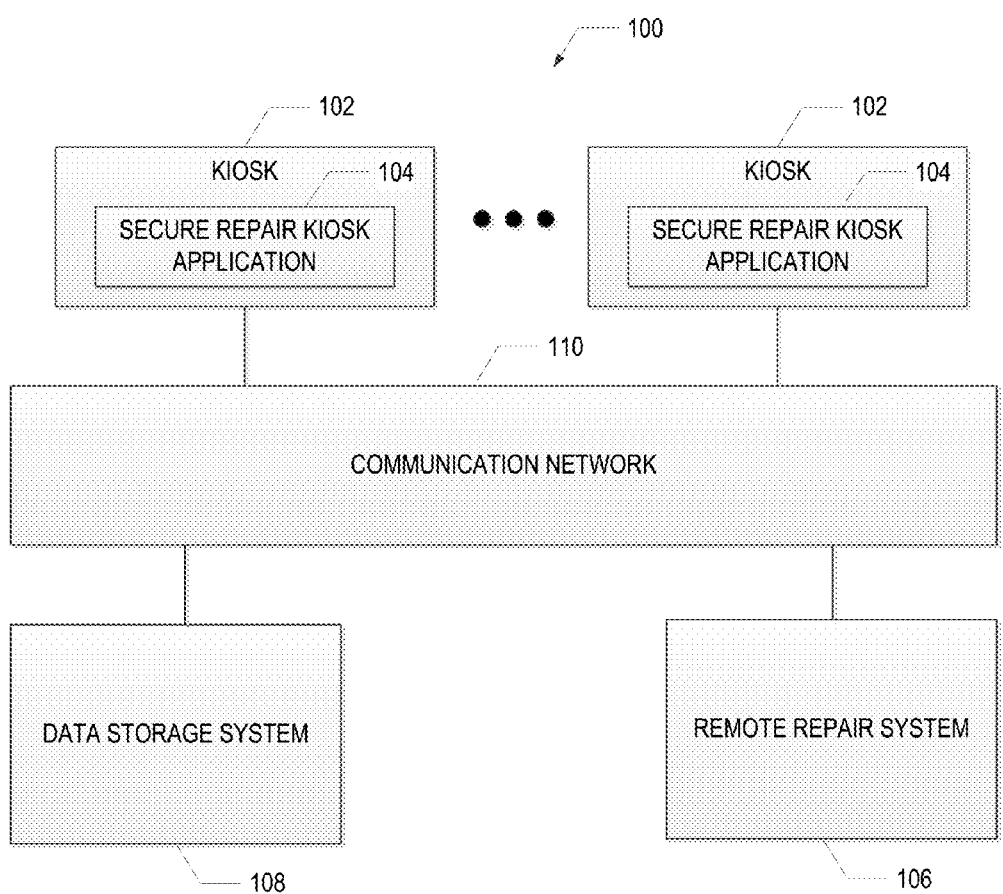
FIG. 1 is a block diagram of a computing environment for implementing a secure kiosk computing system according to an example embodiment.

FIG. 1 shows a block diagram of a secure repair kiosk system 100. The secure repair kiosk system 100 includes one or more kiosks 102 that each includes a secure repair kiosk application 104. The kiosk 102 can communicate with a remote repair system 106 and a data storage system 108 via a communication network 110. Although the remote repair system 106 is depicted as being separate from the data storage system 108, it is contemplated that the data storage system 108 may be included within the remote repair system 106.

The kiosk 102 is an electromechanical apparatus that includes one or more processors and memory and executes the secure repair kiosk application 104 to manage the storage of and retrieval of mobile computing device and/or the storage of image data and authentication data. The secure repair kiosk application 104 also manages the generation of devices drop-off request and device pick-up request. The kiosk 102 may execute the secure repair kiosk application 104 to securely receive data from and/or transmit data to the remote repair system 106 through the communication network 110. The remote repair system is configured to receive the communications and dispatch repairmen according to the device pick-up requests. The kiosk 102 is also configured to securely receive data from and/or transmit data to data to the data storage system 108 through the communication network 110. The data storage system 108 is configured to store any transaction and logging data generated by the kiosk 102 or the remote repair system 106, as will be discussed in further detail below.

The communication network 110 can be the Internet, an intranet, or another wired or wireless communication network. For example, the communication network 110 may include a Mobile Communications (GSM) network, a code division multiple access (CDMA) network, a Long-Term Evolution (LTE) network, a $3^{rd}$ Generation Partnership Project (GPP), an Internet Protocol (IP) network, a wireless application protocol (WAP) network, a WiFi network, or an IEEE 802.11 standards network, as well as various communications thereof. Other conventional and/or later developed wired and wireless networks may also be used.

Figure 2A:
FIG. 2A is a block diagram that depicts exemplary components of the kiosk.

FIG. 2A is a block diagram that depicts exemplary internal and external components of the kiosk 102. The kiosk includes a chassis 200 containing the at least one processor, memory, and communications interface. The chassis securely houses multiple holding slots 202 that each contains a transfer box 204 that is used as a secure and traceable method for transferring devices to and from a remote repair site. A door 205 provides access to the interior of the chassis where the holding slots 202 and transfer boxes 204 are located. According to one aspect, the door 205 includes an electronic lock, such as a motorized lock that is controllable by a processor.

According to one aspect, each holding slot 202 is configured to fit a transfer box 204. Each holding slot 202 may include a visual indicator associated with that slot is activated to identify that the particular holding slot contains a device for repair. The visual indicator is, for example, a green/red light that indicates if the transfer box 204 in the holding slot 202 is empty or contains an electronic device. The logging module maintains the holding slot location and contents of each transfer box 204 in a memory of the kiosk. The contents and location of each transfer box 204 is also maintained in a transfer box data record stored in the data storage system 108.

The kiosk 102 includes a display 206 such as a computer monitor, for displaying data and/or graphical user interfaces. The kiosk 102 also includes an input device 208, such as a keyboard, a pointing device (e.g., a mouse, trackball, pen), or touch screen to enter data into or interact with graphical user interfaces. According to one aspect, the input device 208 and display 206 are integrated, for example, as the depicted touch screen. The kiosk 102 may also include a graphical user interface application that generates a graphical user interface (or GUI) (not shown) on the display 206. The display enables a user of the kiosk 102 to interact with the GUI to submit drop-off requests and/or pick-up requests. For example, a customer can interact with the GUI user interface of the kiosk 102 to generate a repair drop-off request and gain access to an empty transfer box 204 and to submit payment using a payment device 214.

The payment device 214 may include any type of payment system. According to one aspect, the payment device 214 includes a PIN pad including a separate display and a magnetic reader. The payment device 214 is able to accept credit and debit card transactions and utilize the kiosk's network connection to conduct transactions. According to one aspect, the payment device 214 also includes a signature capture pad. The signature capture pad may be integrated into a PIN pad or may be separate. The payment device 214 may also be configured to email the customer a receipt of any transactions.

Figure 2B:
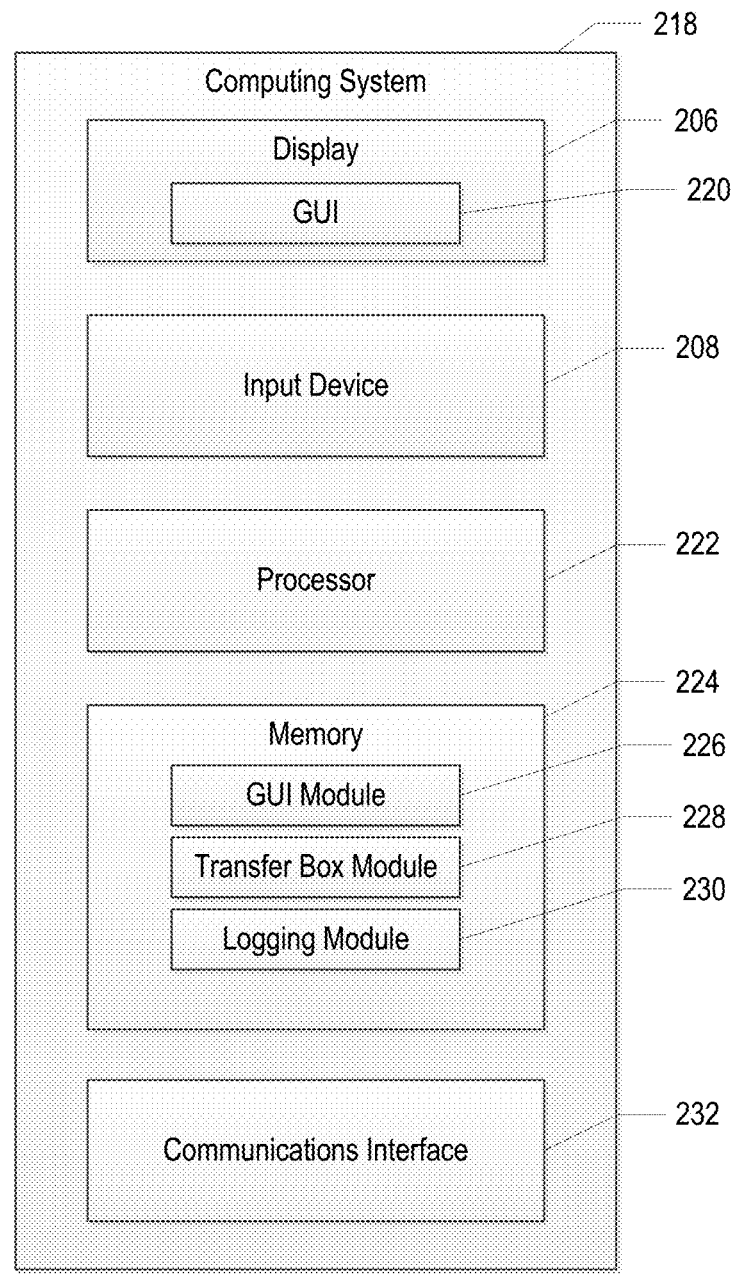
FIG. 2B is a block diagram that depicts an exemplary computing system of the kiosk.

FIG. 2B is a block diagram that depicts an exemplary computing system 218 utilized by the kiosk 102. The kiosk 102 includes at least one processor 222 to process data and a memory 224 to store data. The processor 222 processes communications, builds communications, retrieves data from its memory 224 and stores data to its memory 224. The memory 224 may include volatile and/or non-volatile memory, e.g., a computer-readable storage medium such as a cache, random access memory (RAM), read only memory (ROM), flash memory, or other memory to store data and/or computer-readable executable instructions. The computer-readable executable instructions or modules include instructions for operating a kiosk application.

According to one aspect, the kiosk application is divided into several modules for controlling the various operations of the kiosk, including a graphical user interface (GUI) module 226 for providing a GUI 220 to the user and/or generating instructions for moving transfer boxes, a transfer box module 228 for controlling mechanical operations according to movement instructions, and a logging module 230 for maintaining a log of kiosk contents and operations. In addition, the kiosk 102 further includes at least one communications interface 232 to transmit and receive communications, messages, and/or signals over the communications network 110.

In one aspect, the movement instructions are generated locally in response to user input received via the GUI 220. Stated differently, the movement instructions are not provided from or generated by a remote processing or computing device (e.g., the remote repair system 106, data storage system 108, etc.).

After a particular transfer box 204 is presented to a user during drop-off of the device, that particular transfer box 204 will typically accompany the device during transfer to the repair site, during repair of the device, during transfer back to the kiosk 102, and delivery to the user.

According to another aspect, a customer can interact with the GUI 220 of the Kiosk 102 to submit personal data and/or repair data. Personal data may include, but is not be limited to, the user's name, title, organization, mailing address, e-mail address, personal identification codes, and/or passcodes. In addition, personal data may include digital biometric data describing the user that is collected by other electronic devices, such as a biometric device (not shown) that is connected to or communicatively linked to the kiosk 102.

Repair data may be submitted, for example, by selecting from a predefined list of common issues/repairs associated with mobile devices. Alternatively, repair data may be submitted by a description entered by the user via the GUI 220.

To pick up a repaired device, the customer interacts with the user interface to generate repair pick-up request and gain access the transfer box 204 that contains that users repaired device. The customer is able to log into the kiosk by providing personal information, such as a username, order number, and/or password.

Each transfer box 204 includes a unique encrypted identification code and is equipped with a motorized lock that can only be opened by authorized electronic reader. An electronic reader scans the identification code and provides an encrypted response signal for opening the motorized lock. The electronic reader is configured for wirelessly or contactless communications with the transfer boxes. For example, the electronic reader may be configured to communicate with a transfer box 204 using radio-frequency identification (RFID), near field communication (NFC), Wi-Fi, or other secure short-range communications standard. Each transfer box 204 may also be equipped with a camera configured to take pictures of the contents of the transfer box 204. For example, the camera may include a conventional digital camera and flash positioned at one end of the transfer box 204 and pointed at an angle so as to capture the contents of any devices placed on the inside of the transfer box 204.

The transfer boxes 204 are also configured to be "tamper evident," meaning that if someone attempts to open a transfer box 204 without using an authorized electronic reader, such as by attempting to pry the box open, the signs of the tampering. For example, the transfer boxes 204 may include tamper evident paint for showing scratches caused by attempts to pry the box open.

The kiosk 102 also includes a robotic arm 212 that is responsive to the drop-off and pick-up requests provided to the transfer box module by the GUI module. The transfer box module is configured to control the robotic arm 212 to locate and move a transfer box 204 between a slot 202 and a Pick-Up bay 210. The Pick-Up bay 210 is equipped with an electronic reader (not shown) that can disengage a motorized lock to lock and unlock the transfer box 204. The customer opens the transfer box, places the device in the open box or retrieves their device from the open box, closes the box, and places the box back into the Pick-Up bay 210. The robotic arm 212 then returns the transfer box from the Pick-Up bay 210 to an empty slot 202.

In one aspect, the robotic arm 212 includes a second robotic arm adapted to move transfer boxes 204 into and out of holding slots 202. In another example, a conveyor belt mechanism is adapted to move the transfer boxes 204 into and out of holding slots 202. The robotic arm 212 may also include an electronic reader configured to scan the unique identification code of a transfer box 204. In one aspect, the robotic arm's electronic reader is utilized for verifying the identity of a transfer box 204. For example, when the robotic arm moves to a holding slot 202 to pick up a transfer box 204, the robotic arm may first scan the transfer box to ensure the correct transfer box is being moved. In another example, the robotic arm may be used to take inventory of the transfer boxes 204 present inside the kiosk 102. For example, when a courier picks up the transfer boxes containing electronic devices needing repair, the robotic arm may be used to check each transfer box to ensure that every appropriate transfer box was picked up. Similarly, the robotic arm 212 may be utilized to survey the locations of each transfer box 204 that is dropped off by the courier so that the locations may be stored in the kiosk's memory.

The Pick-Up bay 210 also includes a camera (not shown) for capturing an image of the transfer box 204 with the electronic device. For example, the electronic reader may be fitted with a camera configured to take a picture of the contents of the transfer box each time the reader is used to lock or unlock the transfer box. Each of the photos may then be stored locally on the kiosk's memory or may be transmitted to data storage system 108. By taking a picture of the contents of the transfer boxes each time the transfer box 202 is opened or closed, a photographic record of the contents of the transfer box may be maintained.

The kiosk 102 depicted in FIG. 2A is exemplary and it is contemplated that the appearance of the kiosk 102 may differ from that shown in FIG. 2A. As one example, the pick-up bay 210, display 206, and/or input device 208 may be arranged, positioned, or located differently and the various holding slots 202 may be obscured from view.

Figure 3:
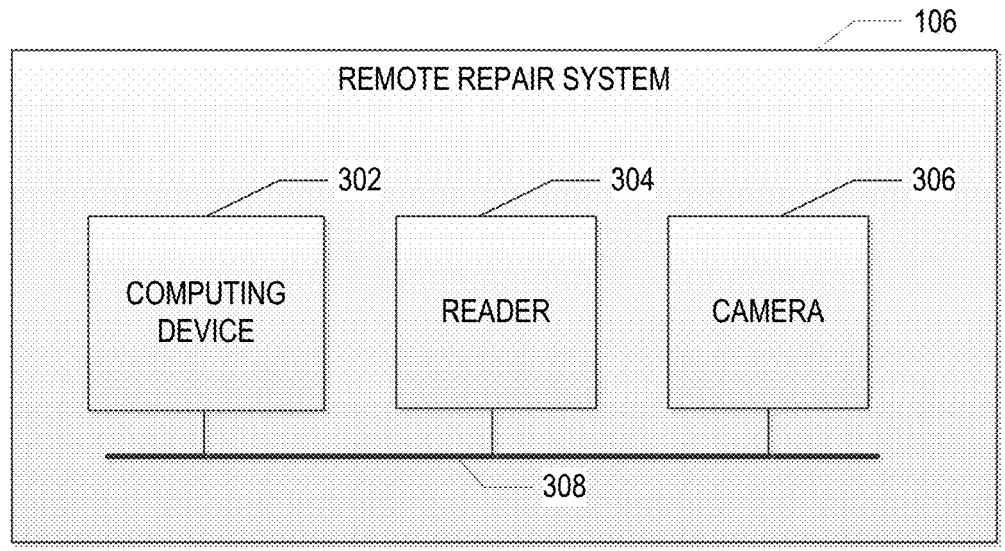
FIG. 3 is a block diagram that depicts exemplary components of a repair system.

Referring now to FIG. 3, the remote repair system 106 is, for example, associated with a repair facility that includes remote computing device (e.g., computer) 302 for receiving requests to pick up transfer boxes with damaged electronic devices, sending dispatch notifications for picking up the transfer boxes, and logging the arrival of a particular transfer box containing a device to be repaired. The repair system 106 may also include other peripheral devices, such as another security reader 304 that can disengage the motorized lock to unlock the transfer box. A repair person or other authorized personnel can open the transfer box via the electronic reader 304 to remove the device. After the device is repaired, the repair person or other authorized personnel places the repaired device back into the transfer box and then closes the box and locks it using the electronic reader 304. The repair system 106 may also include another camera 306 for capturing an image of the transfer box 204 and the contents of the transfer box (the repaired device). The camera 306 may be configured to capture the image anytime the electronic reader is used to lock or unlock the transfer box 204. The peripheral devices may be connected to the computing device via a network, such as a local area network (LAN) 308.

Figure 4:
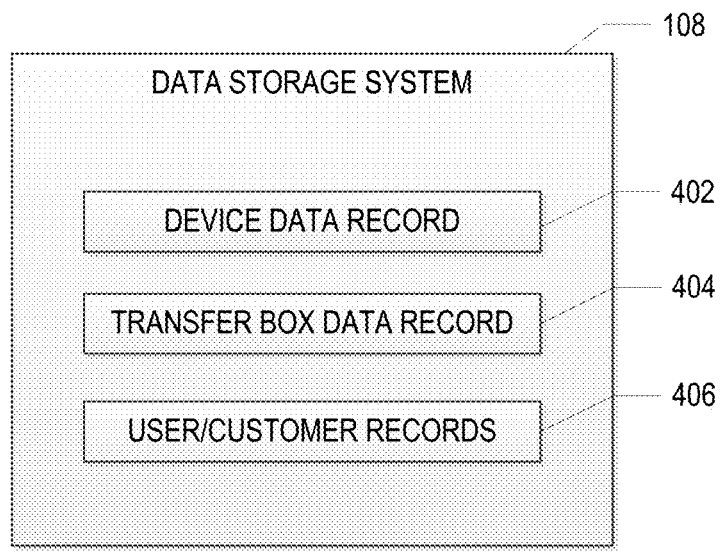
FIG. 4 depicts a block diagram of a data storage system according to one aspect of the secure repair kiosk system.

FIG. 4 depicts an exemplary embodiment of a data storage system 108 according to one aspect of the secure repair kiosk system 100. According to one aspect, the data storage system 108 stores a device data record 402, transfer box data record 404, and user/customer records 406. It is contemplated that the data storage system 108 may include records.

Each device data record 402 includes, for example, captured image data of a particular device, the particular device type, and repair data. The captured image data may include a plurality of images taken each time the transfer box is opened or locked with an electronic reader. It is contemplated that the transfer box data record 150 may also include other types data associated with the device.

Each transfer box data record 404 may also include transfer box identification data. As described in more detail below, each transfer box may have a unique readable identification code associated therewith. The transfer box data record 304 may also include another unique readable identification code of a storage slot in which the transfer box is stored and/or from which it was retrieved. It is contemplated that the transfer box data record 304 may include other types data associated with the transfer box.

Each user/customer record 406 includes personal data that has been submitted by user. As described above, personal data may the user's name, title, organization, mailing address, e-mail address, personal identification codes, passcodes, and/or biometric data. It is contemplated that the user/customer record 406 may include other types data associated with the user/customer.

Figure 5:
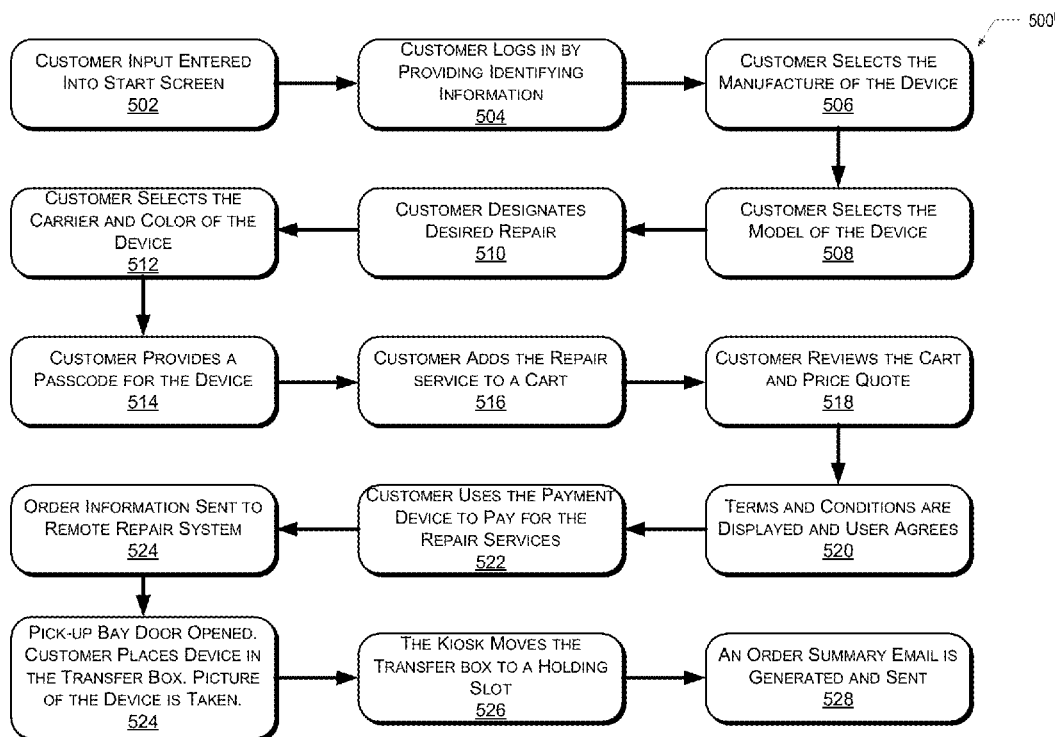
FIG. 5 depicts a flow chart of the operation of the secure repair kiosk system for a customer dropping off an electronic device.
Figure 6A:
Figure 6B:
Figure 6C:
Figure 6D:
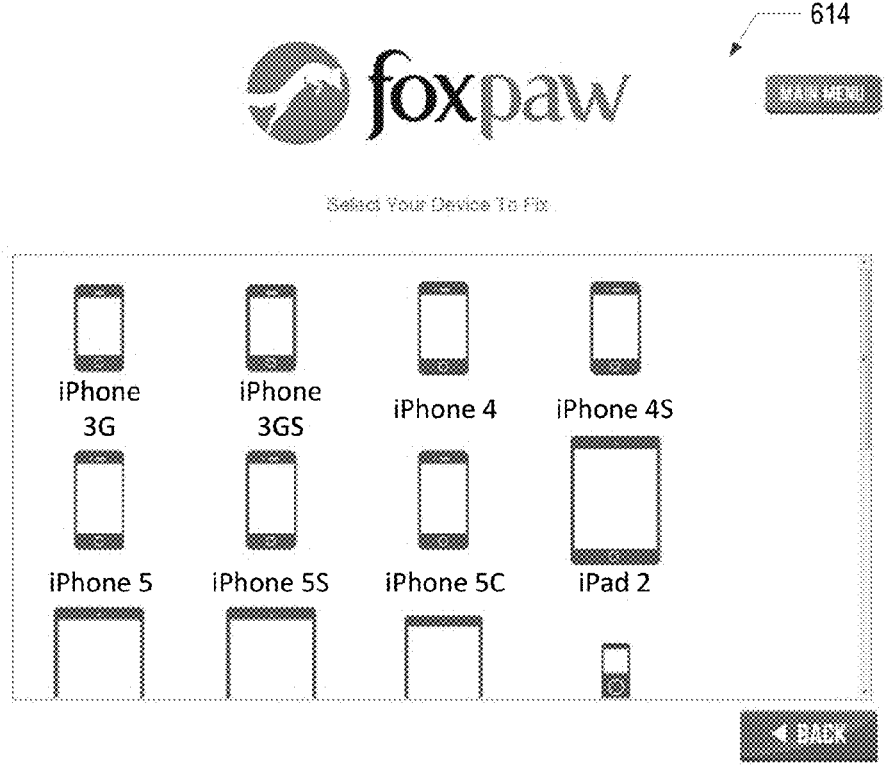
Figure 6E:
Figure 6F:
Figure 6F:
Figure 6F:
Figure 6F:
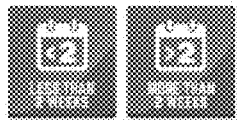
Figure 6F:
Figure 6F:
Figure 6G:
Figure 6H:

The following is an exemplary a flow of a secure method for depositing devices for repair, transferring devices to remote site for repair, and for customer pick-up via the Repair kiosk system 100 according to an exemplary embodiment. Referring to FIG. 5, an example method 500 for depositing devices for repair is depicted. Referring also to FIGS. 6A-I, a sequence of corresponding GUI screens are depicted. Referring to FIG. 6A, a start screen 600 is depicted. The start screen 600 is the first screen initially shown to each customer that approaches the kiosk. In this example, the start screen 600 may include introductory information such as instructions for using the kiosk 602 and customer options for either dropping off 604, 606 or picking up a device 608. In one example, a customer has the option to begin their order online by pre-providing their personal and device information online. In this example, a customer is a new customer who has not previously provided the system with any information.

After approaching the kiosk, the customer selects to drop off using the "Get Started" selection option 604 (Step 502). The kiosk then displays a customer information screen 610 and the customer provides their name and contact information (Step 504). The kiosk then presents the customer with a GUI listing of device manufactures 612. The customer selects a device manufacturer for their device from the list (Step 506). The kiosk then displays a device selection GUI 614 that lists every device model for the selected manufacturer. The customer selects the model of the electronic device that they wish to repair (Step 508) and the kiosk then displays a device issue GUI 616.

The device issue GUI 616 includes a listing potential device issues, issue categories, and diagnostic options. According to one aspect, the device issue GUI 616 includes options for a diagnostic, replacing the full phone assembly, repairing the back case, repairing a headphone jack, replacing a battery, repairing a home button, repairing a front facing camera, repairing a rear facing camera, repairing a charging port, repairing a power button, repairing an earpiece, repairing a speaker, repairing water damage, repairing a silent/ringer switch, or other repairs. The device issue GUI 616 may also be customized depending on the selected user device. For example, some phones may not include a front facing camera. In cases where a user has a device without a front facing camera, the front facing camera repair option would not be shown by the device issue GUI 616. A customer then selects the desired repair (Step 510).

According to one aspect, some of the repairs may require additional diagnostic information from the user. Thus, once a device issue has been selected, a diagnostic GUI 618 may be displayed by the kiosk 102. For example, a user may select using the device issue GUI 616 that an electronic device suffered from water damage. By selecting the water damage option, the diagnostic GUI 618 is activated and displayed. In this case, the diagnostic GUI 618 prompts the user to select the liquid type that cause the damage, the timeframe of when the damage occurred, and whether the phone still charges.

Once a repair service has been selected device carrier GUI 620 is displayed. Since various cell phone carriers utilize different wireless technologies that operate on different wireless frequencies, the actual components inside of a phone of the same make and model may differ. For example, in the United States, AT&T phones may operate on the 700 Mhz, 850 Mhz, and 1900 Mhz bands, while Verizon Wireless phones operate on the 750 Mhz, and 1700 Mhz bands. Frequency usage may also vary by country. Thus, many cell phone manufacturers include different hardware in their phones depending on the carrier that the customer is or will be using. A customer therefore provides their carrier information and, in this example, the color of their phone (Step 512).

Since many electronic devices can be locked with a passcode, the passcode GUI 622 prompts the user to supply a passcode to so that a repairman can unlock the phone as needed to complete any repairs. The customer designates whether they have a passcode on the device and provides the passcode if they have one (Step 514). After receiving the password, all of the required information regarding the device has been provided. In some instances, the user may elect to fill out their personal information and the device information using their personal computer or other electronic device. In this case, Steps 506-514 are all carried out using a web based interface that connects to the data storage system 108 using the communications network 110. When the customer accesses the kiosk, the customer selects the online order option 606 and provides their identifying information, such as a username and password.

Once all of the customer's information and the device information have been received, the customer's entries are added to a shopping cart and the shopping cart is displayed by a shopping cart GUI 624 (Step 516). A customer is able to confirm the information that they entered and are presented with a price for the repair services that they have ordered (Step 518). Each of the repair options has an associate price that is presented at the shopping cart GUI 624. According to one aspect, the user queried to determine if the user has any more devices for drop off. When the user has multiple devices, the system returns the user to the GUI listing of device manufactures 612 and the user repeats Steps 506-518 until they have deposited each of their electronic devices.

Once the customer has viewed their order they can elect to checkout and the customer is shown the terms and conditions for using the kiosk. Once the user has agreed to the terms and conditions (Step 520), the user is directed to finish the transaction using the payment device 214. The payment device 214 allows the user to use a credit or debit card to pay for the repair services (Step 522). If the credit/debit transaction fails, the user may be allowed to retry the transaction up to a predetermined number of times. For example, after 3 failed attempts to provide payment, the customer may be locked out of the kiosk and required to go to a brick and mortar store to have their device repaired.

Once payment has been received the customer is notified to power down their phone and an estimated repair time and timeframe for retrieving the device is displayed on the display 206. A communication is then generated and sent to the remote repair system to signal that a device is being dropped off (Step 524). According to one aspect, an email is sent to the remote repair system that includes the device information, the location of the kiosk, a kiosk identifier, and the transfer box identifier for the transfer box that will be used.

A transfer box is moved by the robotic arm to the pick-up bay according to a movement instruction indicating which transfer box to select and a pick-up bay door is opened. According to one aspect, the pick-up bay door may be on a timer and configured to close once the timer has surpassed a predetermined time. The kiosk may also display a timer GUI that reflects the amount of time remaining until the pick-up bay door closes. The timer GUI may also prompt the user to provide feedback if the user requires more time.

The user places the device in the transfer box, the transfer box ID is logged into memory, and an image of the box containing the device is obtained prior to the robotic arm moving the transfer box to an empty holding slot according to another movement instruction. The image is captured, for example, by a camera located within the Pick-Up bay (Step 526). After image capture, the transfer box is returned to the originating holding slot and slot placement is verified by comparing the logged transfer box ID in the kiosk memory with the transfer box ID in the holding slot (Step 528). The device information supplied by the user, the transfer box information including the location, contents, and photographs, and the customer information are also all sent to the data storage system 108 and stored as the device data record 402, the transfer box data record 404, and the customer record 406. After the transfer box containing the device is placed into a particular holding slot, the visual indicator associated with that slot is activated to identify that the particular holding slot contains a device for repair. The pick-up bay door is closed and an order summary is shown on the kiosk screen that includes the order number. An email containing the order summary is then sent to the customer's email address (Step 530).

Figure 7:
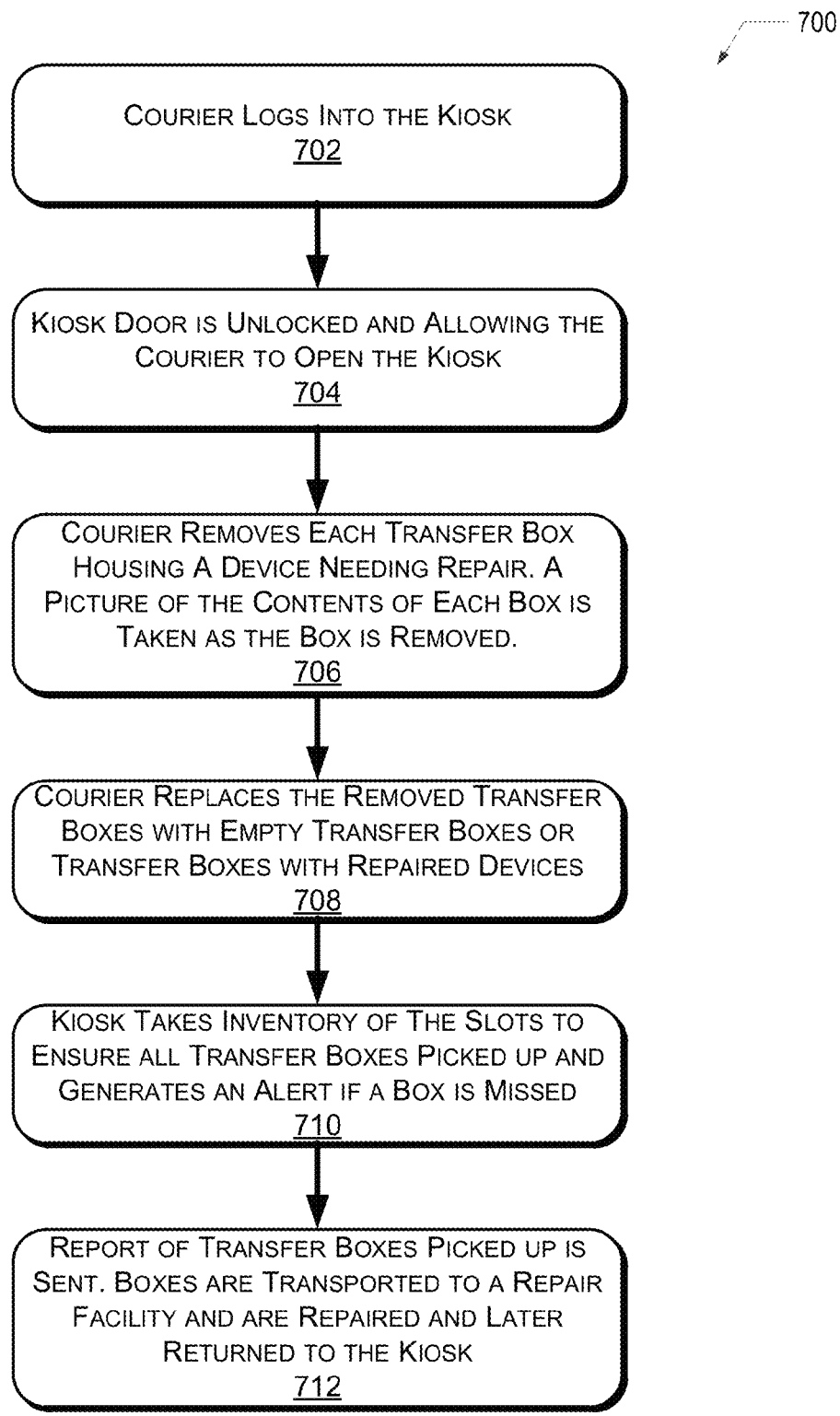
FIG. 7 depicts a flow chart of the operation of the secure repair kiosk system for a courier picking up electronic devices.

An authorized courier is dispatched when one or more electronic devices have been deposited within the kiosk 102. According to one aspect, an email is generated by the kiosk each time an electronic device is deposited. An authorized courier interacts with the user interface to gain physical access to the multiple slots in the Kiosk. Referring to FIG. 7, a method 700 of retrieving one or more transfer boxes from a kiosk is depicted. For example, the authorized courier accesses the kiosk similar to any user and is first presented with a start screen such as the start screen 600 depicted in FIG. 6A. The courier logs into a hidden, courier specific login screen and enters a password via the GUI and user interface (Step 702). According to one aspect, the courier logs in using a 2 factor authentication system. If the courier enters an incorrect username and password combination more than a predetermined number of times, the user may be locked out of the kiosk for a preset time. Once the courier has successfully logged in, the door 200 is unlocked allowing for the courier to have access to the holding slots (Step 704). The courier then removes all transfer boxes from holding slots with electronic devices needing repairs (Step 706). According to one aspect, visual indicators indicating that a device for repair is located at each holding slot. After a transfer box is removed from a slot, the visual indicator is deactivated or changed to a color indicating that there is no longer a transfer box ready to be picked up in the slot. As the courier takes each transfer box, a picture of the contents of each box may be taken. According to one aspect, pictures may be taken by a reader used by the courier to open each box and capture the picture of the contents. According to another aspect, the transfer boxes may include a camera that automatically takes a picture of the contents of the box when it is moved.

The courier may then replace the removed transfer boxes with empty transfer boxes and close the kiosk access door (Step 708). After a courier closes the door 205, the robotic arm takes an inventory of the transfer boxes in the system (Step 710). According to one aspect, the robotic arm moves to each slot and reads the identifier for each transfer box. The kiosk logs slot positions, identifiers of transfer boxes, and/or image data for transfer boxes that have been removed. The robotic arm also verifies that all transfer boxes containing devices for repair have been removed. If a particular transfer box has not been removed, the user-interface will display a message that instructs the courier to pick up the particular transfer box from a certain slot number.

After all transfer boxes containing items for repair have been picked up, a pick up report file is generated sent to the data storage system 108 (Step 712). The pick-up report file includes information related to the transfer boxes that were removed and the current inventory of the kiosk. For example, the transfer report may include the slot positions, transfer box, and/or image data for all transfer boxes that have been removed.

Figure 8:
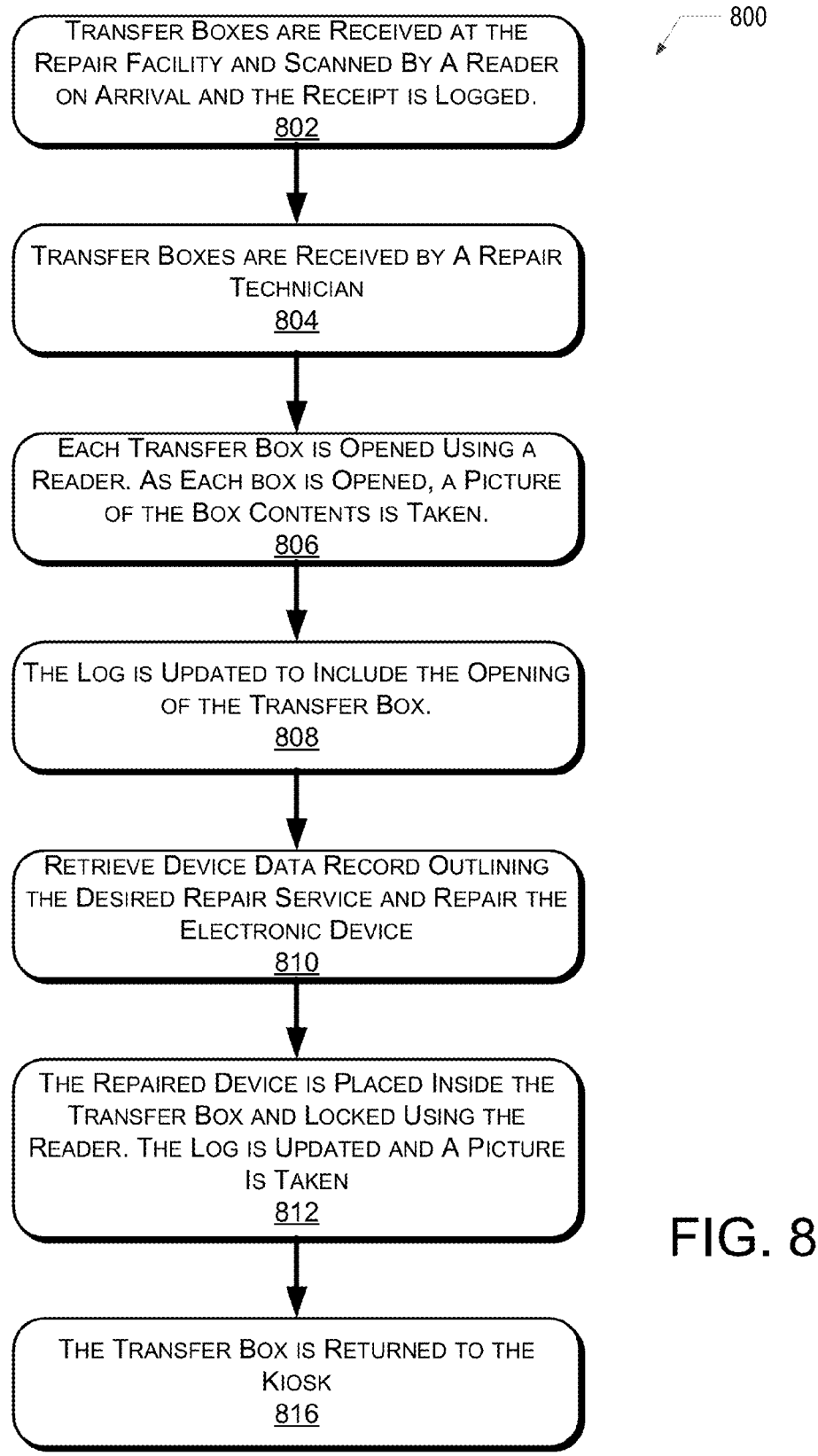
FIG. 8 depicts a flow chart of the operation of the secure repair kiosk system for repairing electronic devices.

Referring to FIG. 8, a method of repairing an electronic device 800 is depicted. When the transfer box arrives at the repair site, the transfer box is scanned using a reader to log receipt at the remote repair system (Step 802). The log is then stored in the data storage system 108.

Transfer boxes are transferred to repair technicians to carry out the desired repairs (Step 804). The repair technician places the transfer box on, or next to, a security reader which unlocks the box and logs that the box was unlocked and by which reader. A picture of the contents of the transfer box is also taken (Step 806). When the transfer box is scanned, the computing device 302 of the remote repair system 102 retrieves the device data record 402 from the data storage system 108 that includes the information provided by the customer regarding the type of repair requested and any additional information that was provided. The opening of the transfer box and the picture taken are then logged (Step 808). The repair technician then carries out the requested repair or diagnostic (Step 810).

After the repair, the repaired device is placed in a transfer box and the transfer box is closed and locked using the electronic reader. The serial number of the box is again logged and added to the transfer box data record 404. A picture of the electronic device is also taken by either the reader or the transfer box and added to the data record 404 (Step 812).

The transfer box is scheduled for return shipment from the remote repair site back to the kiosk. The transfer box is picked up by an authorized courier, scanned using an electronic reader, the transfer box data record 404 is updated, and the transfer box is transported to the Kiosk (Step 816).

The courier returns to the kiosk with the repaired devices and interacts with the user interface to gain physical access to the multiple slots in the Kiosk as described above with reference to FIG. 7. The authorized courier enters a password or passwords using the GUIs to unlock and open the kiosk and expose all holding slots. The courier inserts the box into any of the slots with the green light. After the courier closes the door 205, the robotic arm scans all of the holding slots to determine which transfer boxes have been added to the Kiosk and associates each transfer box, based on the associated transfer box ID, with the various repair jobs. The locations of each transfer box are stored locally on the kiosk and a receiving report is generated that includes the number of boxes, serial numbers, and locations for each added transfer box. The receiving report transmitted to the data storage system 108 to update the transfer box data record 404.

Figure 9:
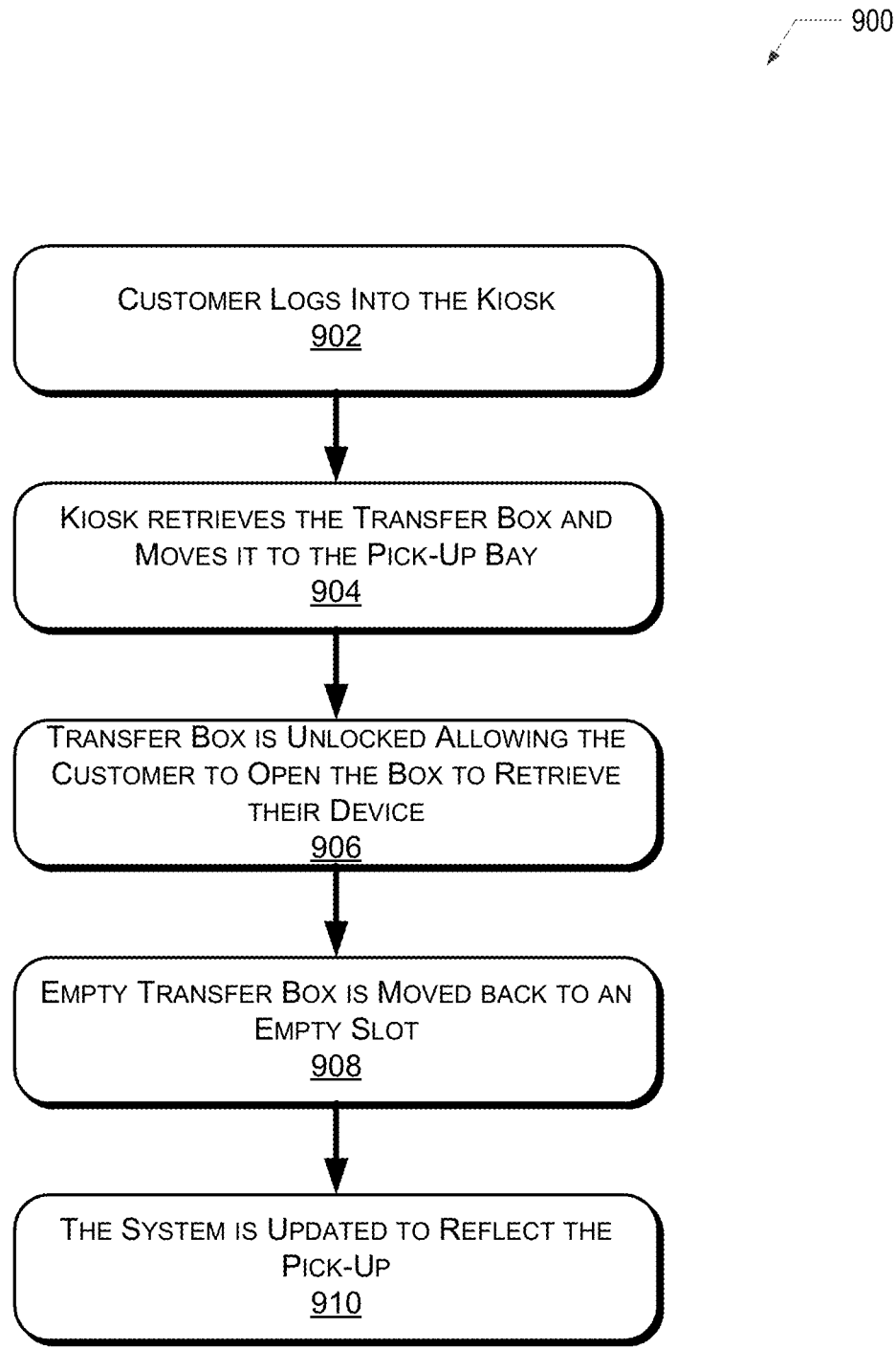
FIG. 9 depicts a flow chart of the operation of the secure repair kiosk system for a customer picking up an electronic device.
Figure 10:
FIG. 10 depicts a graphical user interface used in the operation of the kiosk for a customer to log in to pick up an electronic device.

After a period of time, the customer who dropped off the one or more electronic devices returns to the kiosk to retrieve their devices. Referring to FIGS. 6, 9, and 10, a method of retrieving an electronic device 900 is depicted. When the customer first approaches the start screen 600 is displayed. Using the start screen 600 the customer selects the pick up a device option 608. The kiosk then displays an order pickup GUI 1000 configured to allow for the customer to verify their identity by providing login credentials (Step 902). According to one aspect, the user may supply their order number and email address. The customer may also be prompted to provide a password. Upon authentication, the robotic arm retrieves the transfer box associated with the entered authentication, places transfer box in the Pick-Up Bay, and an image of the box containing the repaired device is captured prior to opening the Pick-Up Bay door (Step 904). The Pick-Up Bay door unlocks the transfer box using the electronic reader and takes a picture of the device completing a picture record of the device that started as soon as the device was dropped off and including each time the transfer box was moved and/or opened. The customer opens the transfer box, retrieves the repaired item from the box and returns the empty transfer box to the Pick-Up bay (Step 906). The robotic arm returns the empty transfer box to the holding slot Bay for the next customer (Step 908). The kiosk memory is updated to reflect that the transfer box is now empty and a pickup report reflecting the device being retrieved by the customer is generated and transmitted to the data storage system 108 to update the transfer box data record 404 (Step 910).

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A repair kiosk comprising:
    a plurality of transfer boxes, each of the plurality of transfer boxes comprising:
        an internal compartment for holding an electronic device;
        a motorized locking mechanism for controlling access to the internal compartment; and
        a communication device storing a unique serial number;
    a chassis having an internal cavity, the internal cavity including a plurality of holding slots each for storing one of the plurality of transfer boxes;
    a pick-up bay providing access to the internal cavity and having a first electronic reader configured to communicate with the communication device to actuate the motorized locking mechanism;
    a robotic arm configured to move an identified transfer box between a pick-up window and the first slot of the holding slots;
    a graphical user interface (GUI) comprising an input device and display; and
    a computing system comprising a processor executing a kiosk application comprising modules executable by the processor and controlling the robotic arm, the kiosk application comprising:
        a graphical user interface (GUI) module to operate the GUI and responsive to user input received locally via the GUI to generate a movement instruction, wherein the movement instruction identifies a particular one of the plurality of transfer boxes;
        a transfer box module configured to control the robotic arm to move the particular transfer box between a corresponding holding slot and the pick-up bay according to the movement instruction and to cause the electronic reader to actuate the motorized locking mechanism when the particular transfer box is in the pick-up bay; and
        a logging module configured to generate a report including the customer input and send the report to a remote computing system.

2. The repair kiosk of claim 1, wherein each of the plurality of holding slots comprises a light configured to indicate the presence of a customer electronic device in the particular transfer box residing in a particular slot.

3. The repair kiosk of claim 1, wherein the robotic arm further comprises a second electronic reader configured to communicate with the communication device to read the unique serial number.

4. The repair kiosk of claim 3, wherein the transfer box module is further configured to cause the robotic arm to move to a slot to read a particular unique serial number of the particular transfer box and provide the logging module with a slot location and the unique serial number.

5. The repair kiosk of claim 1, wherein the customer input comprises:
    at least one customer identifier;
    an electronic device identifier; and
    at least one repair service.

6. The repair kiosk of claim 5, wherein the remote computing system comprises a data storage system configured to store data related to the at least one customer identifier, the electronic device identifier, the at least one repair service, and the unique serial number.

7. The repair kiosk of claim 1, further comprising a payment device configured to conduct an electronic financial transaction, wherein the transfer box module is further configured to operate according to an outcome of the electronic financial transaction.

8. The repair kiosk of claim 1, wherein the pick-up bay further comprises a camera configured to take a picture of an electronic device entering and exiting a particular transfer box at the pick-up bay.

9. A repair kiosk comprising:
    a plurality of transfer boxes, each of the plurality of transfer boxes comprising:
        an internal compartment for holding an electronic device;
        a first camera;
        a motorized locking mechanism for controlling access to the internal compartment; and
        a communication device storing a unique serial number;
    a chassis having an internal cavity, the internal cavity including a plurality of holding slots each for storing one of the plurality of transfer boxes;
    a pick-up bay providing access to the internal cavity, having a first electronic reader configured to communicate with the communication device to actuate the motorized locking mechanism, and a second camera;
    a robotic arm configured to move an identified transfer box between a pick-up window and the first slot of the holding slots;
    a graphical user interface (GUI) comprising an input device and display; and
    a computing system comprising a processor executing a kiosk application comprising modules executable by the processor to:
        operate the display according to a customer input provided using the input device;
        provide the robotic arm with a movement instruction, the movement instruction identifying a particular one of the plurality of transfer boxes; and
        generate a report including the customer input and send the report to a remote computing system.

10. The repair kiosk of claim 9, wherein the customer input includes at least one customer identifier, an electronic device identifier, and at least one repair service, and the remote computing system is a remote repair system that dispatches a courier to retrieve the particular transfer box.

11. The repair kiosk of claim 10, wherein the GUI is further configured to accept an authentication input from the courier and unlock a chassis door that provides access to the internal cavity and the particular transfer box.

12. The repair kiosk of claim 11, wherein the robotic arm further comprises a second electronic reader configured to communicate with the communication device to read the unique serial number.

13. The repair kiosk of claim 12, wherein the GUI is further configured to:
control the robotic arm to move to a first slot to read a first unique serial number associated with the particular transfer box located in the first slot, compare the unique serial number to a second unique serial number, the second unique serial number being defined by input received at the graphical user interface;
generate and display an alert on the display when the first unique serial number is not the same as the second unique serial number; and
generate a second report including the first unique serial number and send the second report to a remote computing system.

14. The repair kiosk of claim 9, wherein the second camera is configured to take a picture of an electronic device entering and exiting the particular transfer box at the pick-up bay.

15. A method of operating a secure kiosk system comprising:
receiving a customer input including at least one customer identifier, an electronic device identifier, and at least one repair service using a graphical user interface (GUI) comprising an input device and display;
controlling a robotic arm to retrieve a transfer box from a holding slot in an internal cavity of a chassis having a plurality of holding slots each for storing one of a plurality of transfer boxes, and move the transfer box to a pick-up bay that provides access to the internal cavity;
unlocking a motorized locking mechanism controlling access to an internal compartment of the transfer box by using an electronic reader at the pick-up bay to communicate with a communication device operating on the transfer box;
controlling the robotic arm to retrieve the transfer box from the pick-up bay and place the transfer box back into the holding slot after an electronic device has been received by the transfer box; and
generating a report including the customer input and sending the report to a remote computing system.

16. The method of claim 15, further comprising taking a picture of the electronic device at the pick-up bay after the electronic device has been received.

17. The method of claim 15, further comprising scanning a unique serial number of the transfer box and including the unique serial number in the report.

* * * * *